United States Patent
Kamoi

(10) Patent No.: US 11,102,361 B2
(45) Date of Patent: Aug. 24, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yusuke Kamoi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 117 days.

(21) Appl. No.: 16/012,804

(22) Filed: Jun. 20, 2018

(65) Prior Publication Data

US 2019/0014228 A1 Jan. 10, 2019

(30) Foreign Application Priority Data

Jul. 4, 2017 (JP) .............................. JP2017-131530

(51) Int. Cl.
*H04N 1/00* (2006.01)
*G06K 15/02* (2006.01)
*G06K 15/00* (2006.01)

(52) U.S. Cl.
CPC ....... *H04N 1/00411* (2013.01); *G06K 15/005* (2013.01); *G06K 15/1868* (2013.01); *H04N 1/00403* (2013.01); *H04N 1/00514* (2013.01)

(58) Field of Classification Search
CPC ............... H04N 1/005; H04N 1/00403; H04N 1/00514; G06K 15/1868
USPC ................................. 358/1.2, 1.15, 1.9, 3.1
See application file for complete search history.

(56) References Cited

U.S. PATENT DOCUMENTS

| 6,281,983 B1 * | 8/2001 | Takahashi .......... | H04N 1/00408 358/1.2 |
| 2006/0181750 A1 * | 8/2006 | Lu ...................... | H04N 1/00466 358/527 |
| 2014/0355045 A1 * | 12/2014 | Ishiyama ........... | H04N 1/00514 358/1.15 |
| 2015/0172487 A1 * | 6/2015 | Kirihara ................ | G06F 3/1253 358/1.14 |
| 2015/0288836 A1 * | 10/2015 | Kanki ................ | H04N 1/00517 358/1.13 |

FOREIGN PATENT DOCUMENTS

| JP | 2004-320717 A | 11/2004 |
| JP | 2010-134859 A | 6/2010 |
| JP | 2013-008224 A | 1/2013 |
| JP | 2016-006667 A | 1/2016 |

OTHER PUBLICATIONS

Mar. 23, 2021 Office Action issued in Japanese Patent Application No. 2017-131530.

* cited by examiner

*Primary Examiner* — Quang N Vo

(74) *Attorney, Agent, or Firm* — Oliff PLC

(57) ABSTRACT

An information processing apparatus includes: a display that displays plural operators for selection of service processes; and a detection unit that detects an operation state of a user who selects any of the service processes. Upon detection of an operation state in which an instruction to execute a service process has been cancelled after issuance of the instruction, the display selectively displays one or more operators for selection of a service process of a same kind as the service process for which the instruction has been cancelled among the plural operators.

17 Claims, 16 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-131530 filed Jul. 4, 2017.

BACKGROUND

Technical Field

The present invention relates to an information processing apparatus and a non-transitory computer readable medium.

SUMMARY

According to an aspect of the invention, there is provided an information processing apparatus including: a display that displays plural operators for selection of service processes; and a detection unit that detects an operation state of a user who selects any of the service processes. Upon detection of an operation state in which an instruction to execute a service process has been cancelled after issuance of the instruction, the display selectively displays one or more operators for selection of a service process of a same kind as the service process for which the instruction has been cancelled among the plural operators.

BRIEF DESCRIPTION OF THE DRAWINGS

Exemplary embodiments of the present invention will be described in detail based on the following figures, wherein.

DETAILED DESCRIPTION

Exemplary embodiments of the present invention are described in detail below with reference to the drawings.

Image Forming Apparatus

Figure 1:
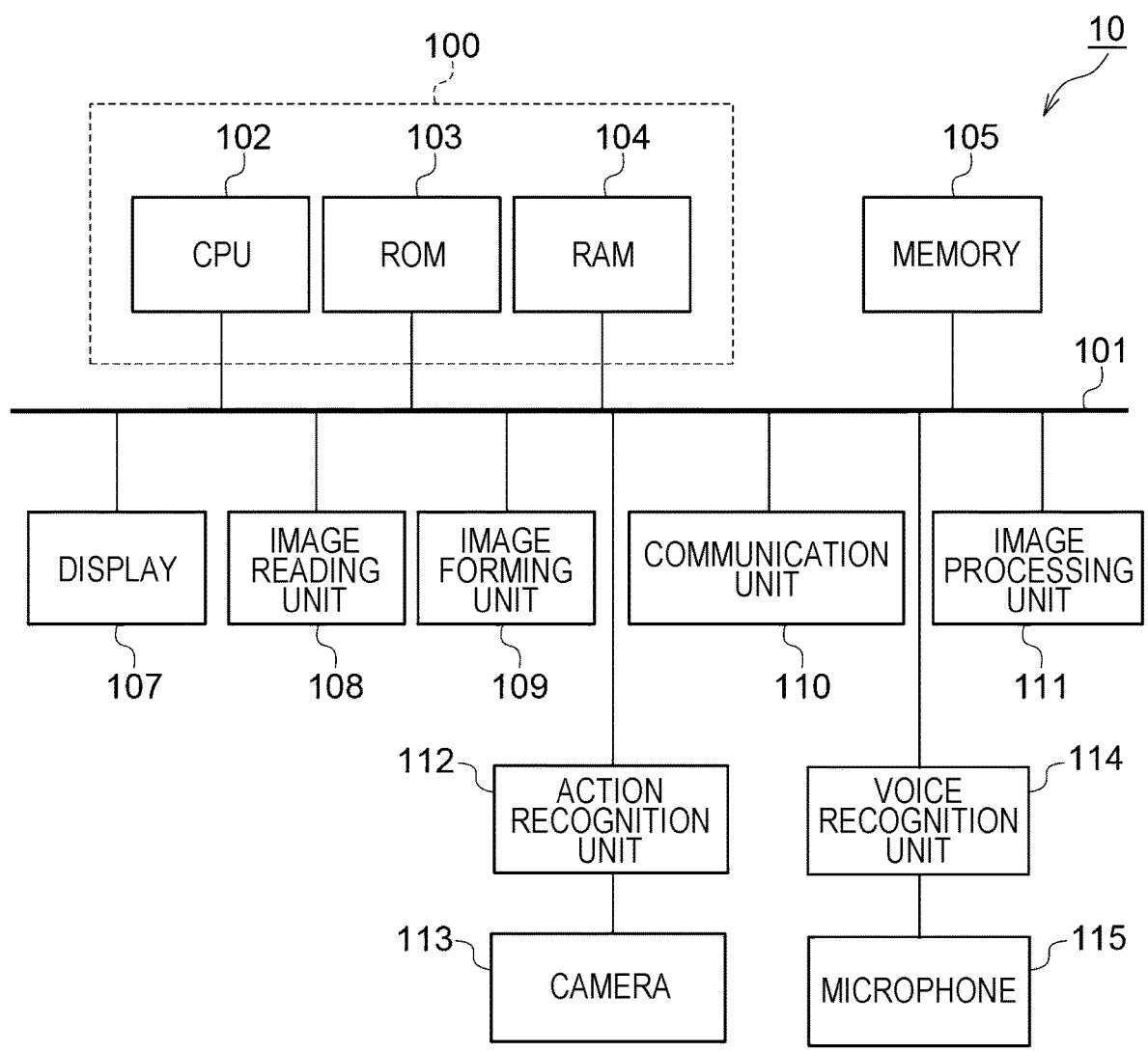
FIG. 1 is a block diagram illustrating a hardware configuration of an image forming apparatus according to an exemplary embodiment of the present invention.

FIG. 1 is a block diagram illustrating a hardware configuration of an image forming apparatus 10 according to an exemplary embodiment of the present invention. The image forming apparatus 10 according to the present exemplary embodiment includes a controller 100, a memory 105, a display 107, an image reading unit 108, an image forming unit 109, a communication unit 110, an image processing unit 111, an action recognition unit 112, and a voice recognition unit 114. These functional units are connected to a bus 101 and exchanges data through the bus 101.

The controller 100 controls the functional units included in the image forming apparatus 10. The controller 100 is constituted by a central processing unit (CPU) 102, a read only memory (ROM) 103, and a random access memory (RAM) 104. In the present exemplary embodiment, a control program executed by the CPU 102 is stored in the ROM 103.

The CPU 102 reads out the control program stored in the ROM 103 and executes the control program while using the RAM 104 as a working area. As a result of execution of the control program by the CPU 102, the functional units of the image forming apparatus 10 are controlled. As a result, for example, predetermined display processing is performed on the display 107, and an image is formed on a recording medium. Furthermore, for example, a document placed on the image reading unit 108 is read.

The program executed by the CPU 102 can be offered while being recorded on a computer-readable recording medium such as a magnetic recording medium (e.g., a magnetic tape, a magnetic disc), an optical recording medium (e.g., an optical disc), a magnetooptical medium, or a semiconductor memory. Alternatively, the program executed by the CPU 102 may be downloaded into the image forming apparatus 10 by using communication means such as the Internet.

The display 107 is, for example, a liquid crystal touch panel display and, for example, displays data concerning the image forming apparatus 10 under control of the controller 100. Furthermore, the display 107 displays a display screen for receiving a user's operation. A user's operation such as selection of a button or page turning (scrolling) is received on the display screen. The received operation or screen transition is stored as an operation history in a memory such as the memory 105.

The image reading unit 108 includes an image reading device (scanner device) that reads a document and generates image data representing an image of the read document. The image reading unit 108 supplies image data generated by the scanner device to the image processing unit 111. The image forming unit 109 includes an image forming mechanism that forms a toner image based on the image data on a recording medium (e.g., a sheet of paper), for example, according to an electrophotographic system.

The communication unit 110 functions as a communication interface that is connected to a communication line (not illustrated) and communicates with another device connected to the communication line. The image processing unit 111 performs image processing such as color correction or gradation correction on input image data. The image processing unit 111 generates the image data that has been subjected to the image processing and then supplies the image data to the image forming unit 109. The memory 105 includes a storage device such as a hard disk device and stores therein, for example, data received by the communication unit 110 and data generated by the image forming apparatus 10.

The action recognition unit 112 is connected to a camera 113 that photographs the image forming apparatus 10. The camera 113 photographs, for example, a front side of the image forming apparatus 10. The action recognition unit 112 detects a user's predetermined action (gesture) on the basis of an image taken by the camera 113. Images of actions corresponding to contents of operation instructions are stored in advance in the memory 105. The action recognition unit 112 acquires contents of an operation instruction given by an action by searching for a similar image from among the images of actions that are stored in advance by using an image recognition method such as pattern matching.

The voice recognition unit 114 is connected to a microphone 115 that detects voice. The voice recognition unit 114 converts voice detected by the microphone 115 into digital voice data and converts digital voice data into text data. Character strings corresponding to contents of operation instructions are stored in advance in the memory 105. The voice recognition unit 114 acquires contents of an operation instruction given by voice by searching for a character string stored in advance from the text data thus obtained.

In the present exemplary embodiment, the voice recognition unit 114 detects a user's operation state from voice (words) uttered by the user on the basis of voice detected by the microphone 115. For example, character strings for an instruction of "cancelling" of an instruction that is given before such as "stop", "no", "cancel", or "undo" are stored in advance in the memory 105. Accordingly, a user's operation state (cancelling of an instruction) is detected from voice such as "stop" uttered by the user by voice recognition.

Similarly, in the present exemplary embodiment, the action recognition unit 112 detects a user's operation state from a user's action (gesture) on the basis of an image taken by the camera 113. An image of an action (gesture) for instruction of "cancelling" may be stored in advance in the memory 105, and a user's operation state (cancelling of an instruction) may be detected from a user's action by action recognition.

In the present exemplary embodiment, the display 107 and the controller 110 that performs a "screen display process" that will be described later are examples of a "display", and the controller 110 that performs a "detection process" that will be described later is an example of a "detection unit". In a case where a user's action is detected, the action recognition unit 112 and the camera 113 are also parts of the "detection unit". In a case where user's voice is detected, the voice recognition unit 114 and the microphone 115 are also parts of the "detection unit".

Home Screen

Figure 2:
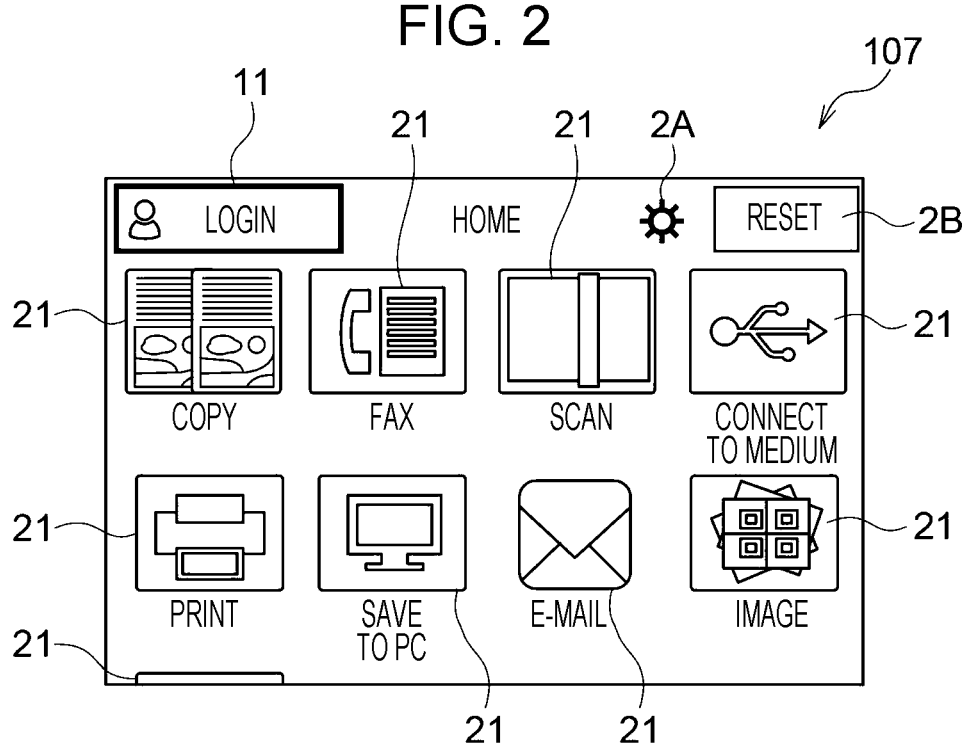
FIG. 2 is a schematic view illustrating an example of a home screen.
Figure 3:
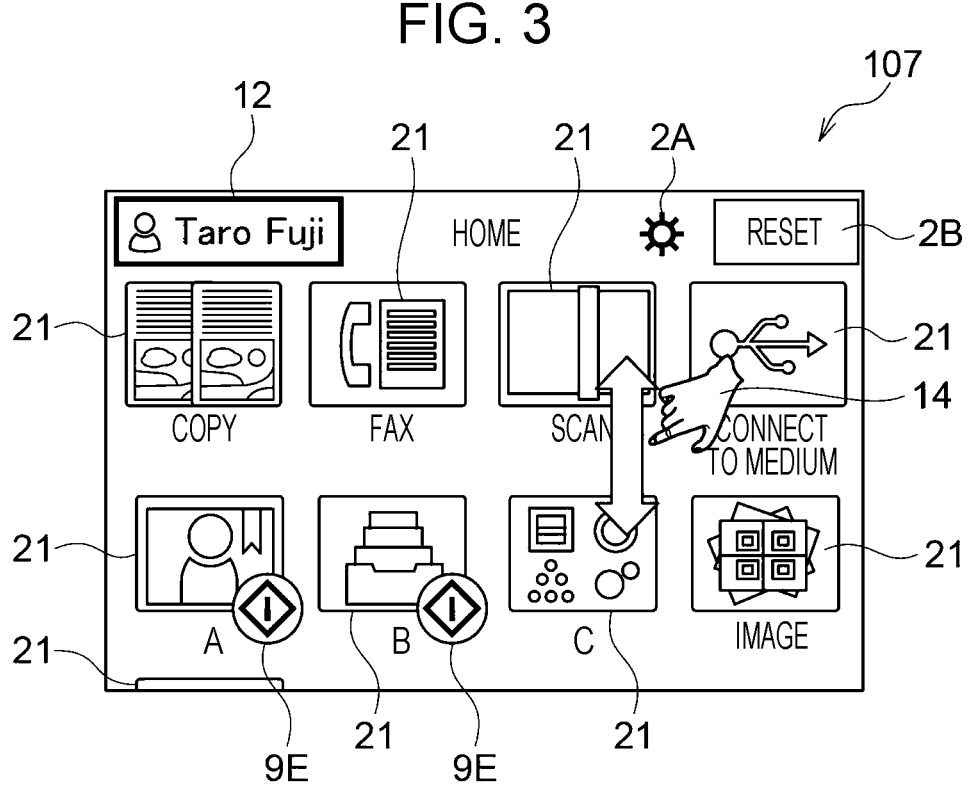
FIG. 3 is a schematic view illustrating an example of a home screen.
Figure 4:
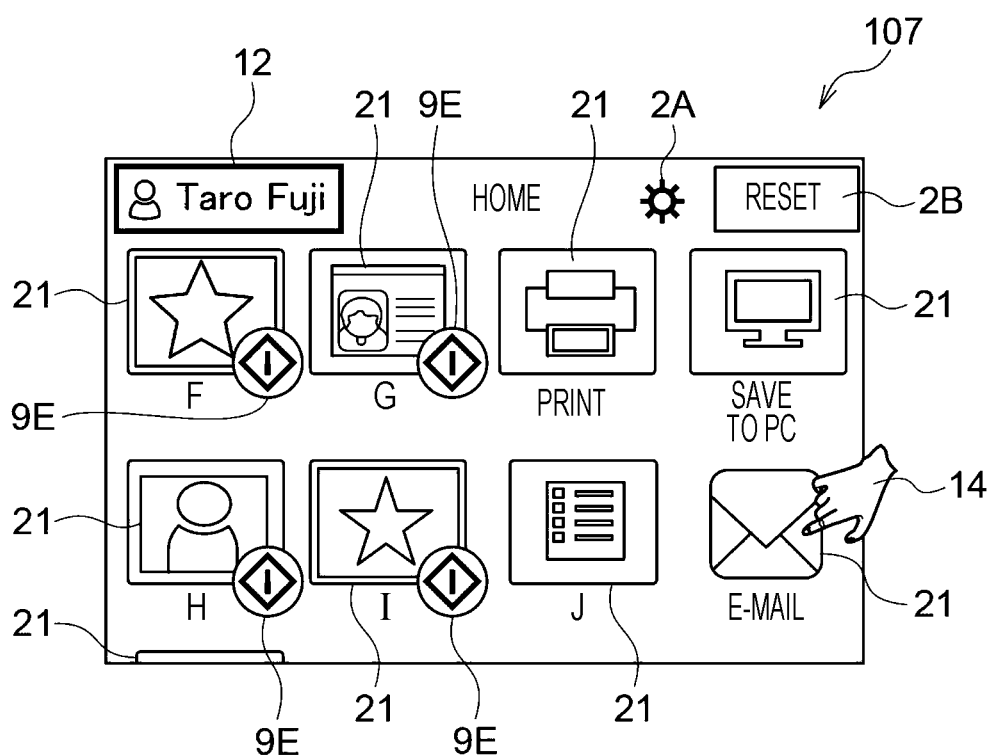
FIG. 4 is a schematic view illustrating an example of a home screen.

FIGS. 2 through 4 are schematic views each illustrating an example of a home screen displayed on the display 107. Before login, the home screen illustrated in FIG. 2 is displayed on the display 107. A login button 11, a setting button 2A, and a reset button 2B are displayed on the home screen before login together with plural selection buttons (icons) 21.

The selection buttons 21 are an example of "operators" for selection of service processes. The "operators" are designs (images) representing operation targets on an operation screen. In the present exemplary embodiment, a service process is represented by a design (image). For example, in a case of an operation using a mouse, a service process is selected by an operation of placing a cursor on an operator and clicking. When any of the plural selection buttons 21 is selected (pressed by a user), a function (service process) associated with the selection button 21 is performed.

In the example illustrated in FIG. 2, selection buttons 21 for selection of service processes "copy", "fax", "scan", "connect to medium", "print", "save to PC", "e-mail", and "image" are displayed as the selection buttons 21. In the example illustrated in FIG. 2, designs used for the selection buttons 21 represent contents of the service processes corresponding to the selection buttons 21.

When the login button 11 is selected by a user, login authentication is executed. In the login authentication, authentication is executed by determining whether or not a user ID, a password, and the like received from the user match information registered in advance.

After the login, a home screen for user illustrated in FIG. 3 is displayed on the display 107. The home screen for user is displayed corresponding to an individual user. The home screen for user is generated on the basis of home screen information stored in association with a user ID.

The stored home screen information includes information on the selection buttons 21 displayed on the home screen for user, information concerning images representing the displayed selection buttons 21, information concerning functions (service processes) associated with the displayed selection buttons 21, and the like.

The plural selection buttons 21, the setting button 2A, and the reset button 2B are also displayed on the home screen for user. After the login, a user name 12 is displayed instead of the login button 11. In the example illustrated in FIG. 3, the selection buttons 21 each for selection of any of service processes "copy", "fax", "scan", "connect to medium", "A", "B", "C", and "image" are displayed.

In the present exemplary embodiment, new selection buttons 21 created by the user are displayed on the home screen for user in addition to the default selection buttons 21 prepared in advance. That is, in a case where a new service process is registered by a user, a new selection button 21 for selection of the registered service process is added to the home screen.

For example, in the example illustrated in FIG. 3, "A", "B", and "C" are service processes registered by the user. In the example illustrated in FIG. 3, designs selected by the user are used for the selection buttons 21 for the service processes registered by the user. The designs selected by the user do not necessarily represent contents of the service processes corresponding to the selection buttons 21.

Service processes registered by a user are classified into a "shared" service process that is used by plural users and an "individual" service process that is used by a user who registers the service process. Furthermore, service processes registered by a user are classified into a "general" service process and a "one-touch" service process. Hereinafter, a selection button 21 for selection of a one-touch service process is referred to as a "one-touch selection button 21".

In the case of a general service process, a confirmation screen for seeking confirmation as to whether or not to execute the service process or a setting screen for detailed setting of a function are displayed when the selection button 21 is selected on the home screen. Execution of the service process is not started just by selecting the selection button 21. Meanwhile, in a case of a one-touch service process, execution of the service process is started just by selecting the one-touch selection button 21 once on the home screen. A confirmation screen and a setting screen are not displayed, and an execution screen indicating that the service process is being executed is displayed.

As illustrated in FIG. 3, a rhombic mark (one-touch badge 9E) indicative of "one-touch" is added to the one-touch selection button 21. In the example illustrated in FIG. 3, the one-touch badge 9E is added to the selection buttons 21 for selection of the service processes "A" and "B". Registration of a one-touch service process will be described later.

In the present exemplary embodiment, the home screen is constituted by plural pages. FIG. 3 illustrates an initial page. As illustrated in FIG. 3, the initial page is switched to another page illustrated in FIG. 4 when the home screen is scrolled in a direction indicated by the arrow by a user's finger 14. When the reset button 2B at an upper right of the screen is pressed by the user, the default initial page is displayed again.

As a result of switching to another page, other selection buttons 21 appear. In the example illustrated in FIG. 4, selection buttons 21 for selection of service processes "F", "G", "print", "save to PC", "H", "I", "J", and "e-mail" are displayed. "F", "G", "H", "I", and "J" are service processes registered by the user. The home screen before the login is also constituted by plural pages, and a page is switched by a user's scrolling operation as in the case of the home screen for user.

Figure 5A:
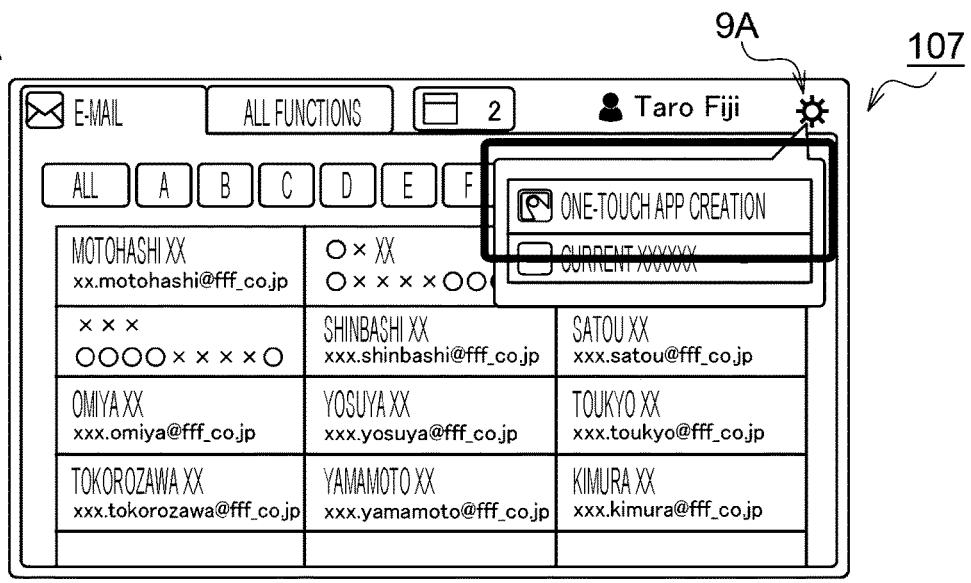
FIGS. 5A through 5C are schematic views each illustrating a display screen displayed in a case where a user creates a one-touch selection button.

In the case of a general service process, a setting screen for detailed setting is displayed when a selection button 21 is continuously pressed for a predetermined period, and thus detailed setting of a function associated with this selection button 21 becomes possible (see FIG. 5A). Then, a process such as copying starts when the user presses a predetermined button such as a start button. In the present exemplary embodiment, the start button is disposed not on the display screen but on another place (not illustrated) of the image forming apparatus.

In a case where setting of a function of a one-touch service process is changed, the setting of the function is changed after shifting to a home screen for setting (not illustrated). In the present exemplary embodiment, the home screen for setting (not illustrated) is displayed when the user presses the setting button 2A. On the home screen for setting (not illustrated), execution of the one-touch service process is not started even when the one-touch selection button 21 is selected, unlike the home screens illustrated in FIGS. 3 and 4.

On the home screen for setting, a setting screen for detailed setting is displayed when a selection button 21 is continuously pressed for a predetermined period, and thus detailed setting of a function associated with this selection button 21 becomes possible (see FIG. 5A). Then, a process such as copying starts when the user presses a predetermined button such as a start button. Note that the start button is disposed not on the display screen but on another place (not illustrated) of the image forming apparatus.

In the present exemplary embodiment, each of the selection buttons 21 on the home screen is moved by a user's operation. Specifically, the selection button 21 is moved by moving the finger 14 while pressing the selection button 21 with the finger 14, i.e., by a drag-and-drop operation.

One Touch

Figure 5B:
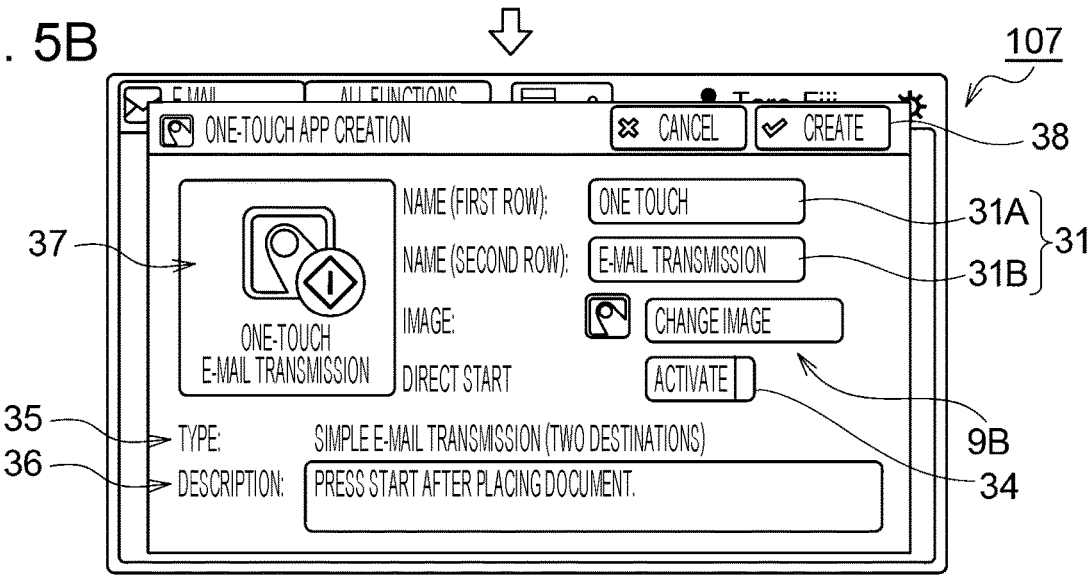
Figure 5C:
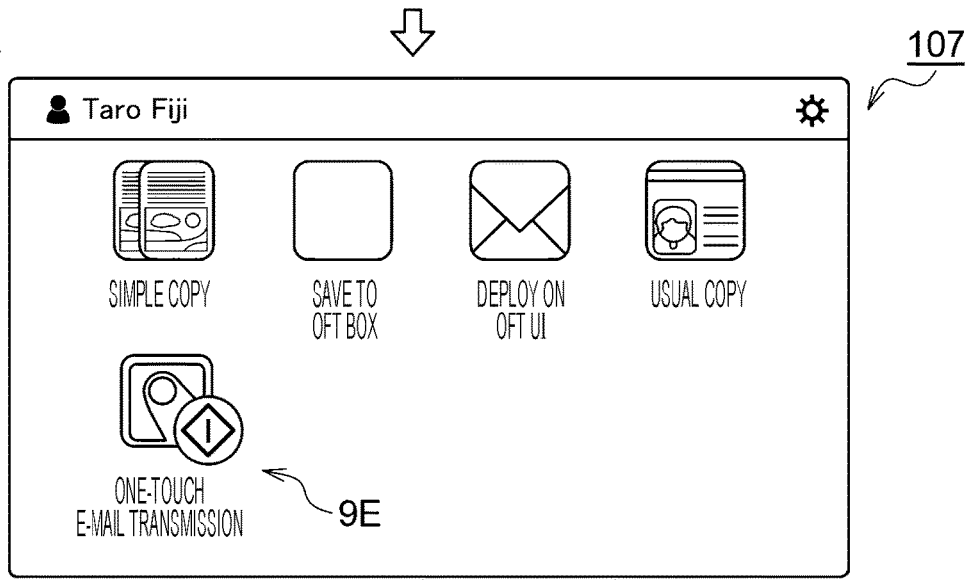

Next, registration of a one-touch service process is described. FIGS. 5A through 5C illustrate display screens displayed in a case where a user creates a one-touch selection button. A setting screen illustrated in FIG. 5A is a setting screen for e-mail transmission. For example, when the selection button 21 for "e-mail" is selected on the home screen illustrated in FIG. 4, a setting screen for e-mail transmission is displayed. Note that "e-mail" is a general service process.

When a setting button 9A is pressed by a user on the setting screen illustrated in FIG. 5A, a button for "one-touch app creation" illustrated within the bold black frame is displayed. When this button is selected, a creation screen illustrated in FIG. 5B is displayed. On the creation screen, buttons, boxes, and the like for user's entry of information necessary for creation of a one-touch selection button 21 are displayed. Specifically, name boxes (the first row and the second row) 31, an image changing button 9B, a one-touch selection button 34, a type display part 35, a description box 36, a preview display part 37, a creation button 38, and the like are displayed on the creation screen.

Figure 6:
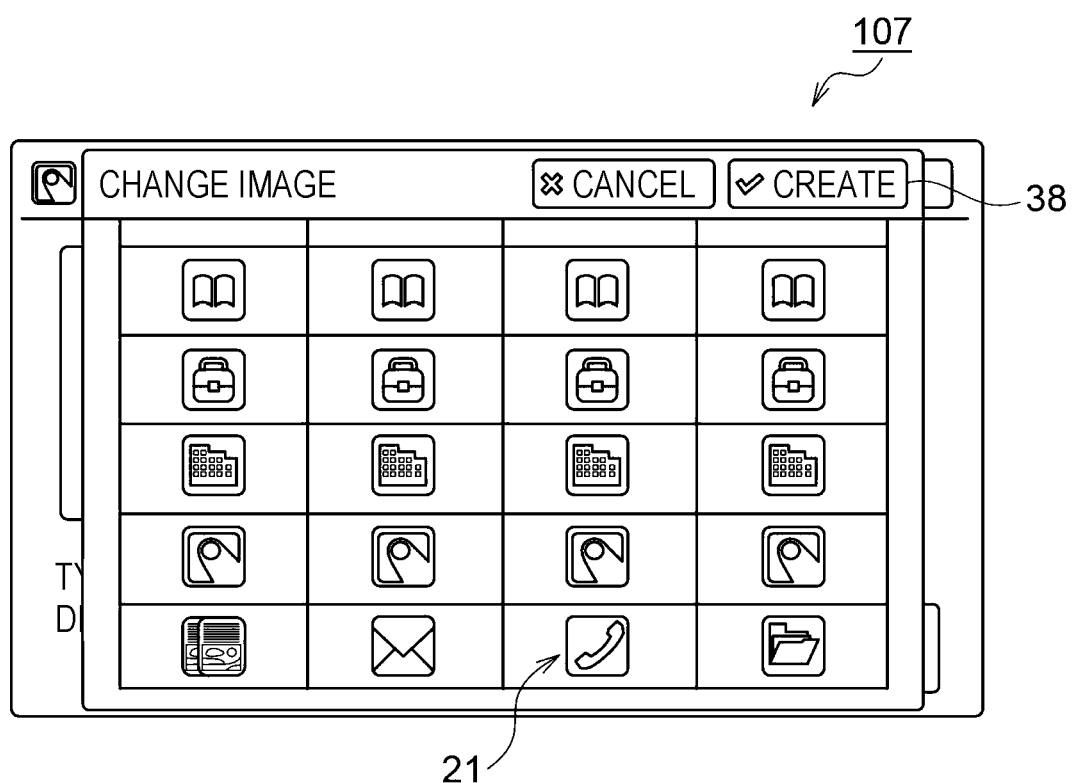
FIG. 6 illustrates a list of one-touch selection buttons.

In the name boxes 31, the user enters a name of the selection button 21 to be created. The image changing button 9B is a button for changing an image used for the selection button 21 (operator) to be created. When the image changing button 9B is pressed by the user, a list screen showing a list of images used for a one-touch selection button 21 illustrated in FIG. 6 is displayed. When an image is selected by the user, a default image is changed to the selected image.

The one-touch selection button 34 is a button for selecting whether to "activate" or "deactivate" direct start. The one-touch selection button 34 is a slide-type button that can select whether to "activate" or "deactivate" direct start (one-touch) based on leftward or rightward movement of a tab. In a case where "activate" is selected by the one-touch selection button 34, the created selection button 21 becomes a "one-touch selection button 21".

In this case, the one-touch badge 9E is added to the one-touch selection button 21 displayed on the home screen as described above. The one-touch badge 9E makes it possible to visually distinguish a one-touch selection button 21 and a general selection button 21 on the home screen. Meanwhile, in a case where "deactivate" is selected by the one-touch selection button 34, the created selection button 21 becomes not a "one-touch selection button 21" but a general selection button 21.

In the type display part 35, a type of a function associated with the selection button 21 to be created is displayed. In the description box 36, a description about the selection button 21 to be created is entered by the user. In the preview display part 37, how the selection button 21 to be created is displayed on the home screen is displayed. The creation button 38 is a button for completing creation of the selection button 21.

When user's entry on the creation screen illustrated in FIG. 5B is finished and the creation button 58 is pressed by the user, the creation screen illustrated in FIG. 5B is switched to the home screen illustrated in FIG. 5C. A one-touch selection button 21 "one-touch e-mail transmission" is added to the new home screen. The one-touch badge 9E is added to the selection button 21 "one-touch e-mail transmission". Although registration of a one-touch service process has been described above, a general service process can also be registered in the present exemplary embodiment.

Since the new selection button 21 is added by the user as described above, the selection button 21 other than the selection buttons 21 prepared in advance is displayed on the home screen for user. Plural selection buttons 21 given an identical design or name or given similar designs or names may be sometimes displayed. In a case where a one-touch selection button 21 is added, execution of a service process is started just by selecting the one-touch selection button 21 once on the home screen.

This makes the user hesitant to select a selection button 21. Furthermore, even in a case where the selection buttons 21 are managed by the user, a selection button 21 for a "shared" service process is sometimes added by a third party. Because of these reasons, it is harder for the user to select a target selection button 21 than in a case where no new selection button 21 is added.

In the present exemplary embodiment, an operation state of a user selecting a selection button 21 is monitored, and a new home screen is displayed upon detection of an operation state in which an instruction to execute a service process is given and is then cancelled. Note that examples of a user's operation also include an operation based on an action such as gesture input and an operation based on voice such as voice input in addition to operations made on the display 107 such as selection of a button and scrolling.

On the new home screen, one or more selection buttons 21 for selection of a service process of the same kind as a service process for which an execution instruction has been cancelled among the plural selection buttons 21 displayed on the original home screen are selectively displayed. This makes it easier for a user who selects a service process again to select the target selection button 21 than in a case where the original home screen continues to be displayed.

Screen Display Process

Figure 7:
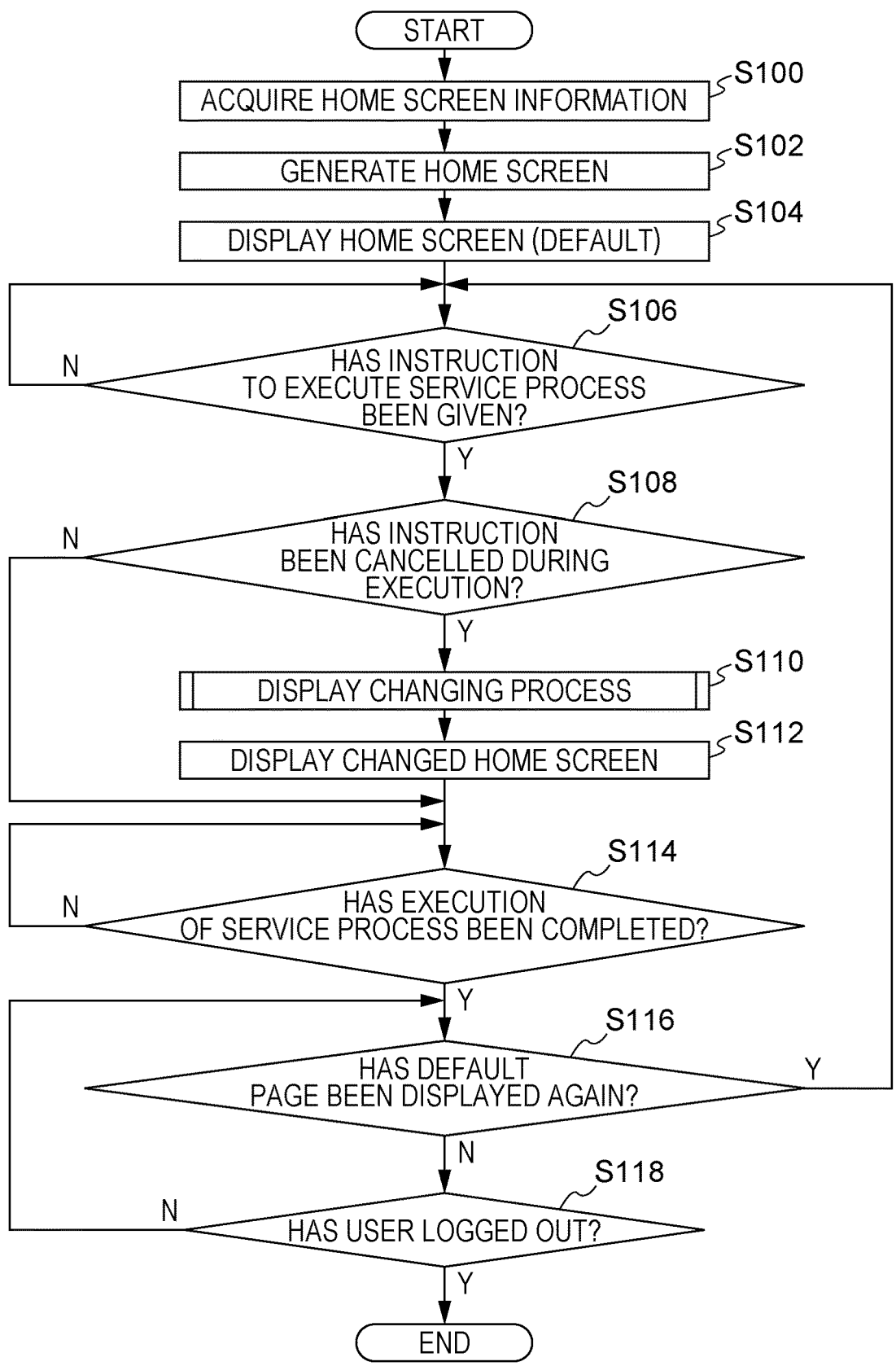
FIG. 7 is a flowchart illustrating an example of a flow of a "screen display process"
Figure 8:
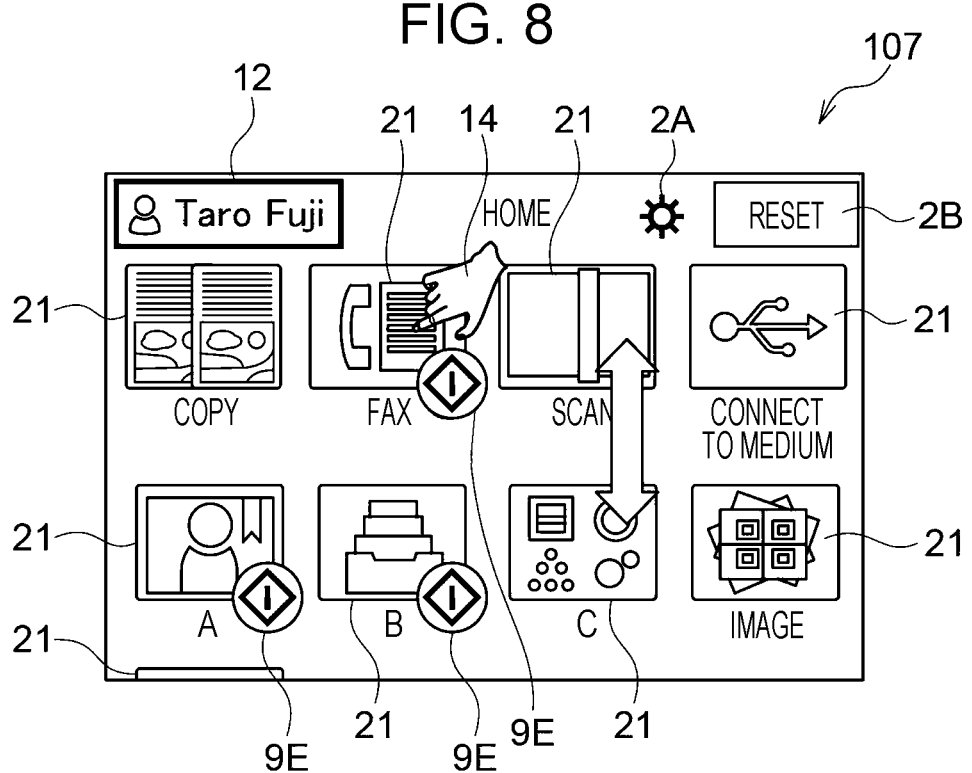
FIG. 8 is a schematic view illustrating an example of an operation on a home screen.
Figure 9:
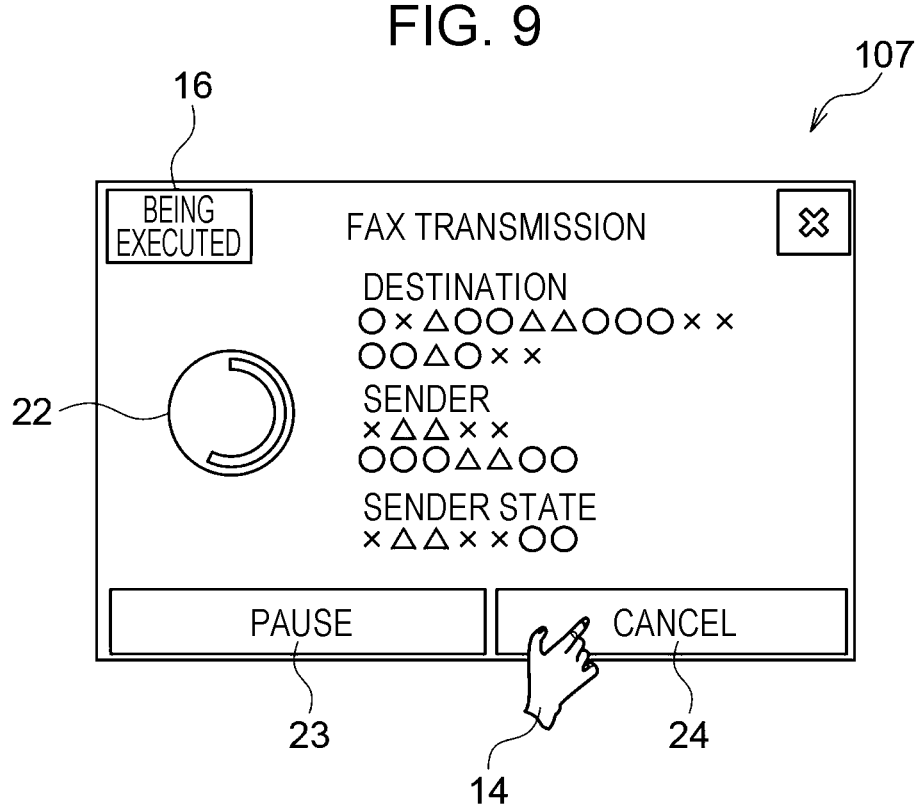
FIG. 9 is a schematic view illustrating an example of an execution screen.

Next, a "screen display process" is described. FIG. 7 is a flowchart illustrating an example of a flow of the "screen display process". FIG. 8 is a schematic view illustrating an example of an operation on the home screen. FIG. 9 is a schematic view illustrating an example of an execution screen. A control program for executing the "screen display process" and the like is stored in advance in the ROM 103 of the controller 100, and the control program is read out from the ROM 103 and executed by the CPU 102. Execution of the "screen display process" is started by user's login.

First, in Step 100, user's home screen information stored in the memory 105 is acquired. Next, in Step 102, a home screen for user is generated on the basis of the acquired home screen information. Next, in Step 104, the generated home screen for user is displayed on the display 107. As described above, the home screen is constituted by plural pages, and a default initial page is displayed on the display 107.

Next, in Step 106, it is determined whether or not an instruction to execute a service process has been given. In a case where an instruction to execute a service process has been given, Step 108 is performed. Meanwhile, in a case where an instruction to execute a service process has not been given, the process for determining whether or not an instruction to execute a service process has been given in Step 106 is repeated until execution of a service process is completed.

Next, in Step 108, it is determined whether or not the instruction to execute a service process has been cancelled (i.e., undone). In a case where the instruction has been cancelled, Step 110 is performed in which a "display changing process" is performed. In a case where the instruction to execute a service process has been cancelled, the service process is stopped in a case where the service process is being executed and execution of the service process is not started in a case where the service process has not been executed yet. In a case where the instruction to execute a service process has not been cancelled, Step 114 is performed while omitting the processes such as the "display changing process".

In the present exemplary embodiment, a state where an instruction to execute a service process is given and is then cancelled is detected. This operation state is an operation state in which a user gives an instruction to execute a service process and then "cancels selection", for example, because the user notices a mistake in selection of a selection button 21. In a case of a one-touch service process described above, an instruction to execute a service process is given just by selecting a one-touch selection button 21 on the home screen. For this reason, a user notices a mistake in selection of a selection button 21 after giving an instruction to execute a service process more often than in a case of a general service process.

For example, as illustrated in FIG. 8, in a case where a selection button 21 for one-touch "fax" is selected on the home screen, it is determined that an instruction to execute the service process has been given and the home screen is switched to an execution screen for fax transmission illustrated in FIG. 9. On the execution screen for fax transmission, a message 16 indicating that the service process is being executed, a progress ring 22 showing a progress of the service process, a pause button 23, a cancel button 24, and the like are displayed in addition to "setting contents" such as a destination, a sender, and a transmission state.

The cancel button 24 is a button for canceling an instruction to execute a service process. When the cancel button 24 is pressed, execution of a service process is cancelled. In the example illustrated in FIG. 9, a destination (e.g., B company) is preset in one-touch "fax", and therefore fax transmission to the B company is started just by selecting the selection button 21 because of a one-touch function. In a case where a user notices that the destination is wrong, the user cancels fax transmission by pressing the cancel button 24 on the execution screen for fax transmission.

The progress ring 22 visually shows a progress of a service process by using a pie chart. The pause button 23 is a button for suspending execution of the service process. When the pause button 23 is pressed once, execution of the service process is stopped, but when the pause button 23 is pressed again, execution of the service process is resumed.

Although an example in which an instruction to execute a service process is cancelled by an operation on a screen has been described above, an instruction to execute a service process may be cancelled by a cancelling instruction given by voice (utterance of a word such as "stop") or a cancelling instruction given by an action (a gesture such as "crossed fingers") since the image forming apparatus 10 according to the present exemplary embodiment includes the action recognition unit 112 and the voice recognition unit 114.

Next, in Step 110, the "display changing process" for changing contents displayed on the home screen is performed. As described above, home screen information is stored for each user. The home screen information includes information on the plural selection buttons 21 displayed on the home screen for user. Associated with each of the plural selection buttons 21 are a kind of function, information on an image representing the selection button 21, and information on the function. The information on the function is referred to as "relevant information".

The kind of function is a kind of service process such as copying or fax. The information on an image representing the selection button 21 is information on an image of the selection button 21 displayed on the home screen. The "information on an image representing the selection button 21" displayed on the home screen includes information on an image used for the selection button 21, information on an image added to the selection button 21, and information on a name written along the selection button 21, as in the case of the preview display part 37 illustrated in FIG. 5B. The image added to the selection button 21 is an image of a badge such as the one-touch badge 9E.

The relevant information includes information on a use form of a service process, information on the number of times of execution of the service process, and information on contents of setting of the service process. In the present exemplary embodiment, "shared" or "individual" is stored as the use form of a service process. The information on the number of times of execution of the service process is updated every time the service process is performed. The contents of setting of the service process are detailed contents of setting of a function associated with the selection button 21.

Figure 10:
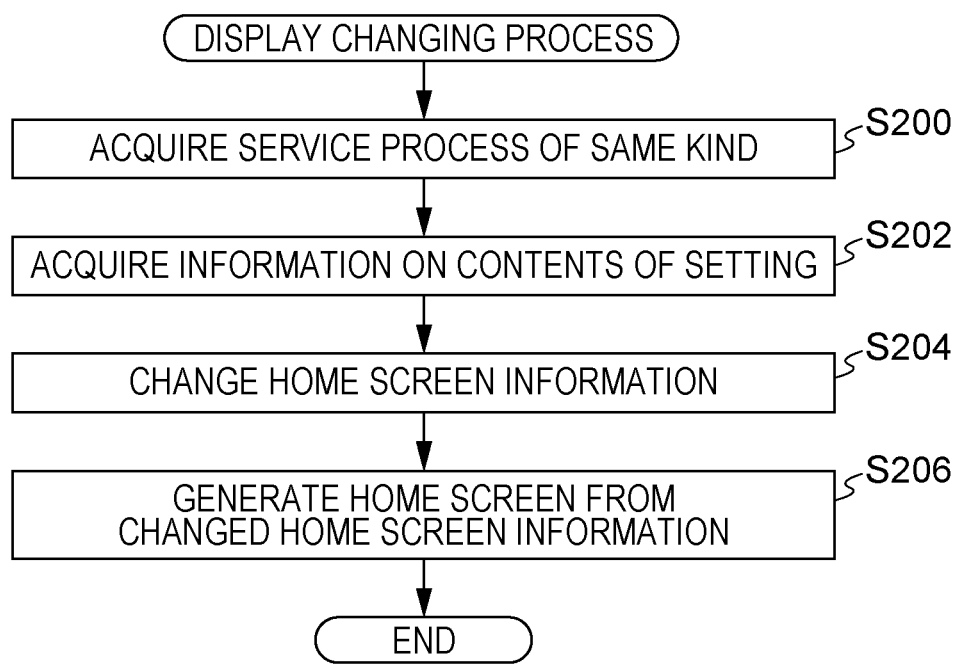
FIG. 10 is a flowchart illustrating an example of a flow of a "display changing process"

FIG. 10 is a flowchart showing an example of a flow of the "display changing process". In the "display changing process", a service process of the same kind as a service process for which an execution instruction has been cancelled is searched for from the home screen information in Step 200 as illustrated in FIG. 10. For example, in a case where the service process for which an execution instruction has been cancelled is "fax", a service process for executing a fax function is searched for. Next, in Step 202, information on contents of setting of the service process is acquired for a selection button 21 for the service process of the same kind as the service process for which an execution instruction has been cancelled.

Next, in Step 204, the home screen information is changed. Specifically, the information on the plural selection buttons 21 displayed on the home screen for user is changed so that only the selection button 21 for the service process of the same kind as the service process for which an execution instruction has been cancelled is displayed on the home screen. Furthermore, image information of a setting contents display part 9G that will be described later is generated, and the information on the image of the selection button 21 is changed so that the setting contents display part 9G overlaps the selection button 21.

Next, in Step 206, a new home screen is generated on the basis of the changed home screen information, and then the routine is finished.

Figure 11:
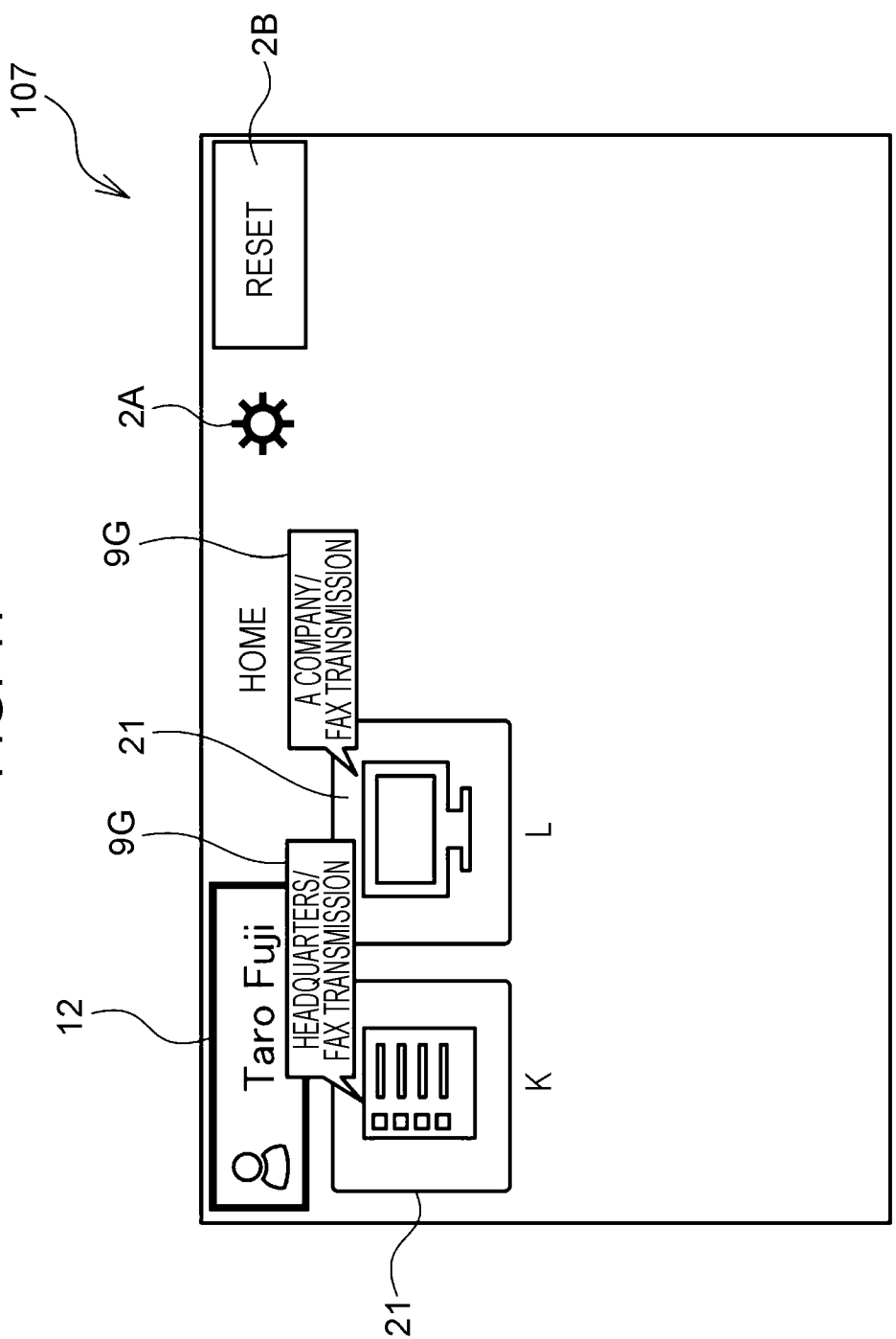
FIG. 11 is a schematic view illustrating an example of a changed home screen.

The following returns to description of the flowchart illustrated in FIG. 7. When the "display changing process" is finished, the changed home screen is displayed in Step 112. FIG. 11 is a schematic view illustrating an example of the changed home screen. On the changed home screen, the selection button 21 for the service process of the same kind as the service process for which an execution instruction has been cancelled is selectively displayed.

In the example illustrated in FIG. 11, "fax" is the service process for which an execution instruction has been cancelled, and "K" and "L" are selection buttons 21 for selection of service processes for executing a fax function. Other selection buttons 21 are not displayed, and only the selection buttons 21 "K" and "L" are displayed on the home screen. Furthermore, the selection button 21 (the selection button 21 for "fax" selected with the finger 14 in FIG. 8) for the service process for which an execution instruction has been cancelled is not displayed on the home screen.

To each of the selection button 21, the setting contents display part 9G associated with the selection button 21 is added. In the example illustrated in FIG. 11, a fax destination (e.g., headquarters, A company) and a text (FAX transmission) indicative of a type of service process are displayed as the setting contents display part 9G. The setting contents display part 9G "headquarters/FAX transmission" is added to the selection button 21 "K", and the setting contents display part 9G "A company/FAX transmission" is added to the selection button 21 "L".

Next, in Step 114, it is determined whether or not execution of the service process has been completed. When an instruction to execute a service process is given by selecting a selection button 21 on the original home screen or the changed home screen, the service process corresponding to the selected selection button 21 is executed. In a case where execution of the service process is completed, Step 116 is performed. Meanwhile, in a case where execution of the service process has not been completed, the determining process in Step 114 is repeated.

There are two routes to Step 114. One of the two routes is a case where Step 114 is performed after the instruction is cancelled in Step 108 and the "display changing process" is performed, and the other one of the two routes is a case where the instruction is not cancelled in Step 108 and then Step 114 is performed. In the present exemplary embodiment, it is assumed that the service process is executed to the last in either case. In a case where "the instruction to execute the service process is cancelled before completion of execution of the service process" in Step 114, the initial page (default) of the home screen is displayed again (not illustrated).

Next, in Step 116, it is determined whether or not the default page has been displayed again. In a case where the default page has been displayed again, Step 106 is performed again. Every time the default page is displayed again, the process for determining "whether or not an instruction to execute a service process is cancelled after the instruction to execute the service process is given" is repeated. Meanwhile, in a case where the default page is not displayed, Step 118 is performed. Next, in Step 118, it is determined whether or not the user has logged out. In a case where the user has logged out, the routine is finished. Meanwhile, in a case where the user has not logged out, Step 116 is performed again.

In the present exemplary embodiment, in a case where an instruction to execute a service process is given and is then cancelled, it is predicted that a user who selects a service process again selects a service process of the same kind as the service process for which the execution instruction has been cancelled, and a selection button 21 for the predicted service process is selectively displayed on the home screen.

Hereinafter, the selection button 21 for the service process of the same kind as the service process for which the execution instruction has been cancelled is referred to as a "selection button 21 for the predicted service process". Furthermore, the selection button 21 for the service process of the same kind as the service process for which the execution instruction has been cancelled is referred to as "one or more selection buttons 21" when compared with other selection buttons 21.

In the present exemplary embodiment, only the selection button 21 for the predicted service process is displayed, and the other selection buttons 21 are not displayed. Accordingly, the number of selection buttons 21 displayed on the changed home screen is smaller. This makes it easier to select a target selection button 21 than on the original home screen.

Furthermore, since the selection button 21 for the service process for which the execution instruction has been cancelled is not displayed on the changed home screen, it is possible to save the user from selecting the selection button 21 for the mistakenly selected service process again.

Furthermore, since the setting contents display part 9G indicative of contents of setting of the service process is added to the selection button 21 displayed on the changed home screen, the user can select the target selection button 21 by using the added setting contents display part 9G as a clue. For example, in a case where "fax destination (headquarters, A company etc.)" is displayed on an icon of the selection button 21, the user can find the target selection button 21 for fax transmission without trouble. Since the setting contents display part 9G varies from one selection button 21 to another, it is possible to determine whether or not to select a selection button 21.

Although the setting contents display part 9G is added as a badge to the selection button 21, it is only necessary that information that contributes to selection of a selection button 21 be added to the selection button 21 for the predicted service process, and relevant information other than contents of setting of the service process may be added. For example, a "shared badge" generated in accordance with information on a use state of a service process may be added, or a "number badge" generated in accordance with information on the number of times of execution of a service process may be added.

Modification

Although an example in which only one or more selection buttons 21 are displayed and the other selection buttons 21 are not displayed has been described in the first exemplary embodiment, the one or more selection buttons 21 need just be selectively displayed, for example, by displaying the one or more selection buttons 21 in a relatively emphasized manner. For example, the one or more selection buttons 21 may be displayed in a more noticeable manner than the other selection buttons 21 or the other selection buttons 21 may be displayed in a less noticeable manner than the one or more selection buttons 21.

Example of the display form in which the one or more selection buttons 21 are more noticeable than the other selection buttons 21 include displaying the one or more selection buttons 21 in a size larger than an original size (see FIG. 12), displaying the one or more selection buttons 21 at a density higher than an original density, and displaying the one or more selection buttons 21 at brightness higher than original brightness. Plural display forms may be combined. For example, the one or more selection buttons 21 may be displayed in a "larger size" and at a "higher density. By displaying the one or more selection buttons 21 in a more noticeable manner than the other selection buttons 21, attention is attracted to the one or more selection buttons 21.

Figure 15:
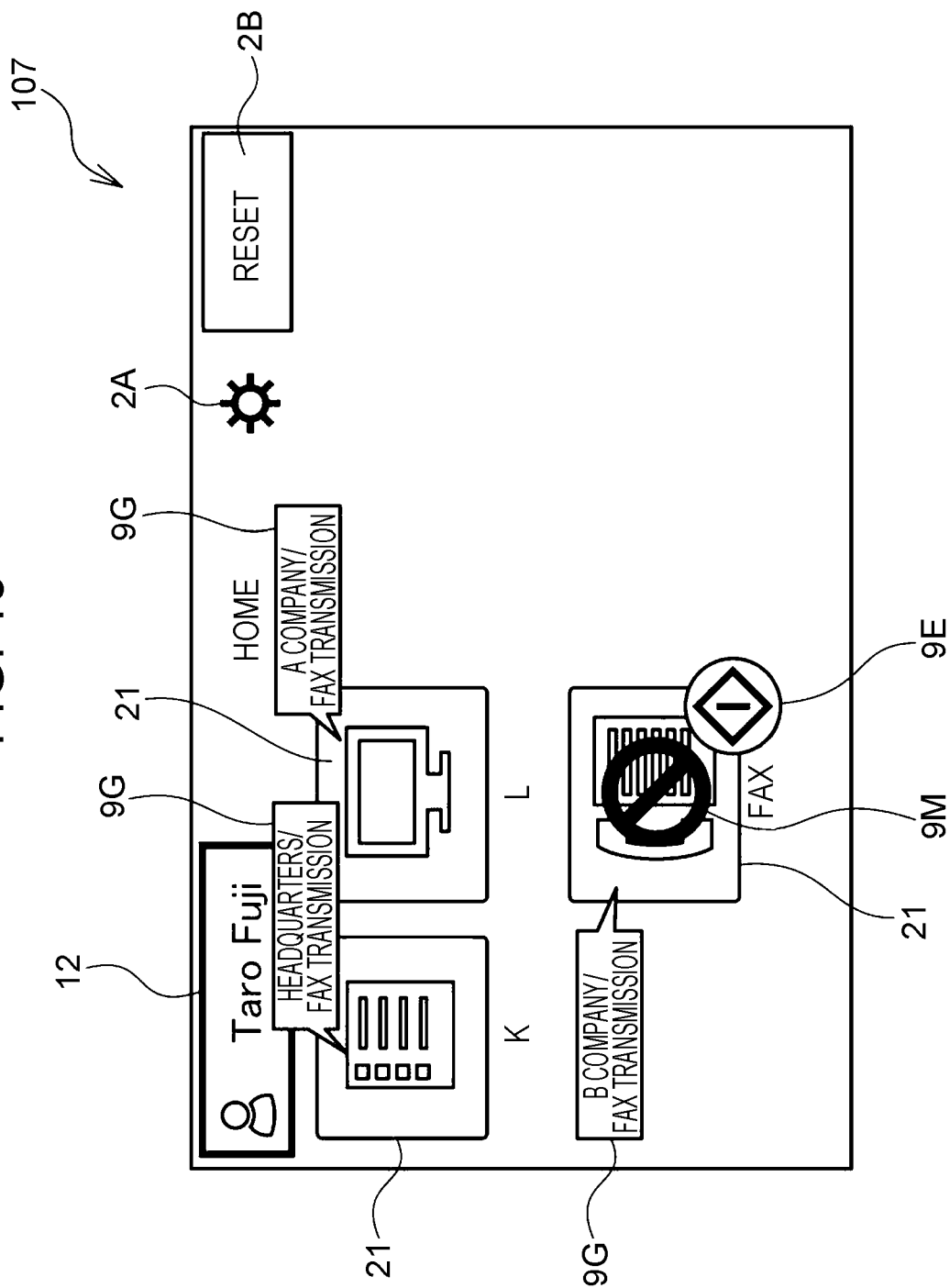
FIG. 15 is a schematic view illustrating a modification of a changed home screen.

As illustrated in FIG. 11, adding the setting contents display part 9G to the one or more selection buttons 21 is an example of the display form in which the one or more selection buttons 21 are more noticeable than the other selection buttons 21 (see also FIG. 15). The setting contents display part 9G varies from one selection button 21 to another and is therefore useful for selection of a selection button 21.

Figure 12:
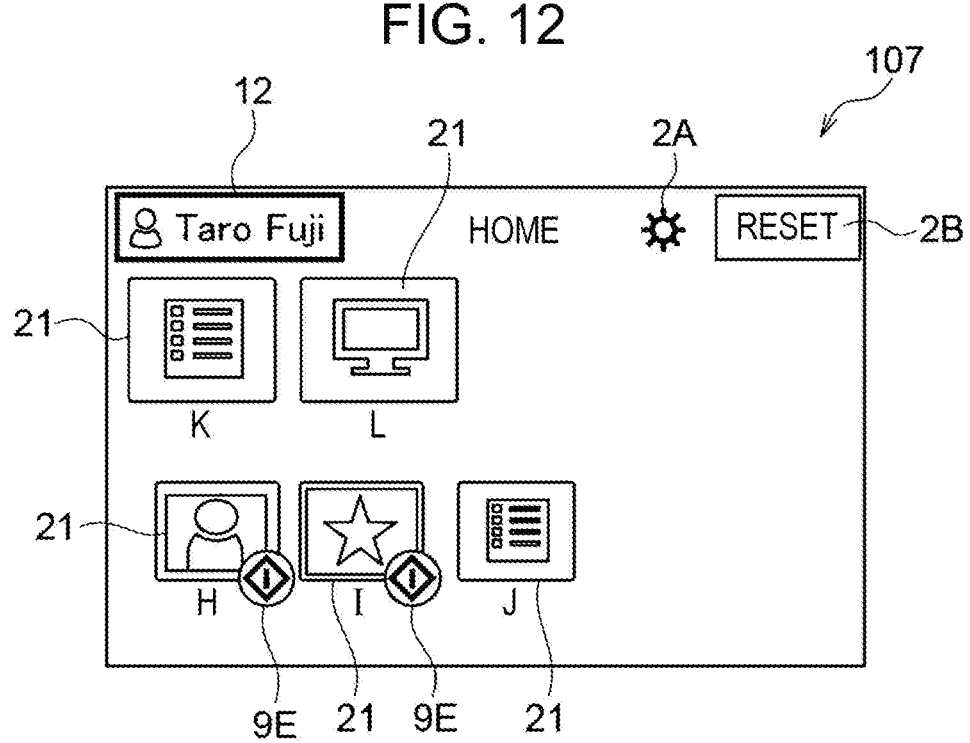
FIG. 12 is a schematic view illustrating a modification of a changed home screen.

FIG. 12 is a schematic view illustrating a modification of the changed home screen. In the example illustrated in FIG. 12, the service process for which the execution instruction has been cancelled is "fax", and selection buttons 21 "K" and "L" corresponding to a fax function are displayed on the home screen. The other selection buttons 21 are also displayed on the home screen. The selection buttons 21 "K" and "L" are displayed in a larger size than the other selection buttons 21.

Examples of the display form in which the other selection buttons 21 are less noticeable than the one or more selection buttons 21 include displaying the other selection buttons 21 in a size smaller than an original size, displaying the other selection buttons 21 at a density lower than an original density (see FIG. 13), and displaying the other selection buttons 21 at brightness lower than original brightness. Plural display forms may be combined. For example, the other selection buttons 21 may be displayed in a "smaller size" and at a "lower density. As illustrated in FIG. 11, displaying no other selection button 21 is an example of the display form in which the other selection buttons 21 are less noticeable than the one or more selection buttons 21.

By displaying the other selection buttons 21 in a less noticeable manner than the one or more selection buttons 21, the other selection buttons 21 are excluded from options. In some cases, it is easier to select a target selection button 21 in a case where the other selection buttons 21 are displayed.

Figure 13:
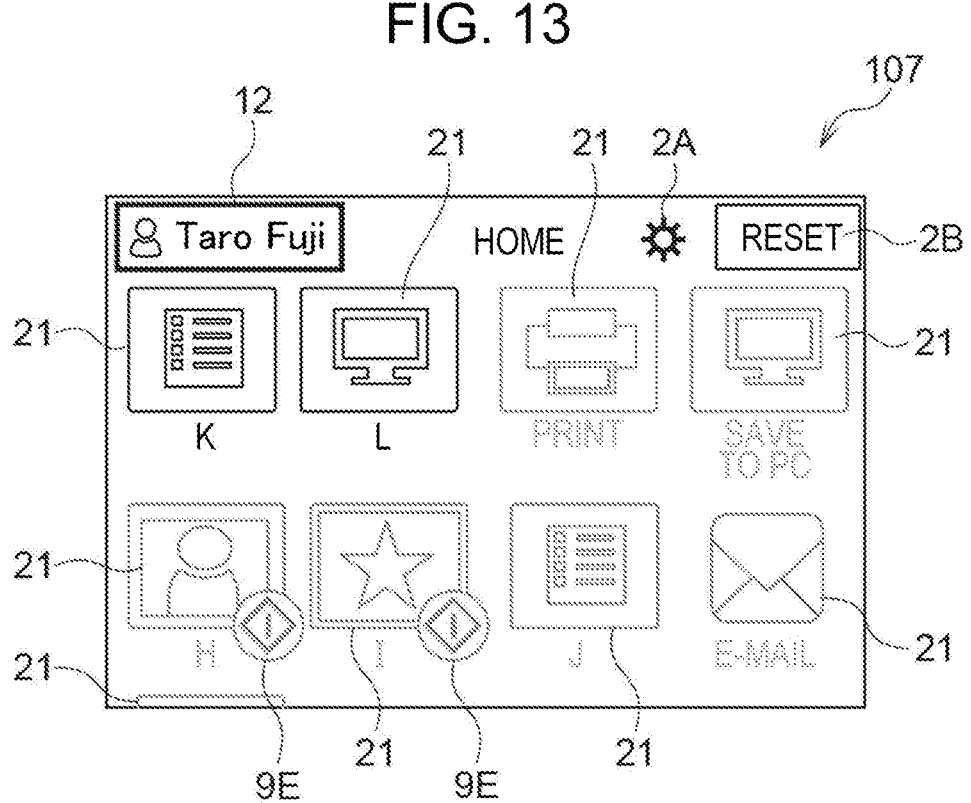
FIG. 13 is a schematic view illustrating a modification of a changed home screen.

FIG. 13 is a schematic view illustrating a modification of the changed home screen. In the example illustrated in FIG. 13, the service process for which the execution instruction has been cancelled is "fax", and the selection buttons 21 "K" and "L" corresponding to a fax function are displayed on the home screen. The other selection buttons 21 are also displayed on the home screen. The other selection buttons 21 are paler and are therefore displayed in a less noticeable manner than the selection buttons 21 "K" and "L".

Second Exemplary Embodiment

In the second exemplary embodiment, a selection button 21 for a service process for which an execution instruction has been cancelled is displayed on a changed home screen. The second exemplary embodiment is similar to the first exemplary embodiment except for this, and description of parts identical to those in the first exemplary embodiment is omitted.

Figure 14:
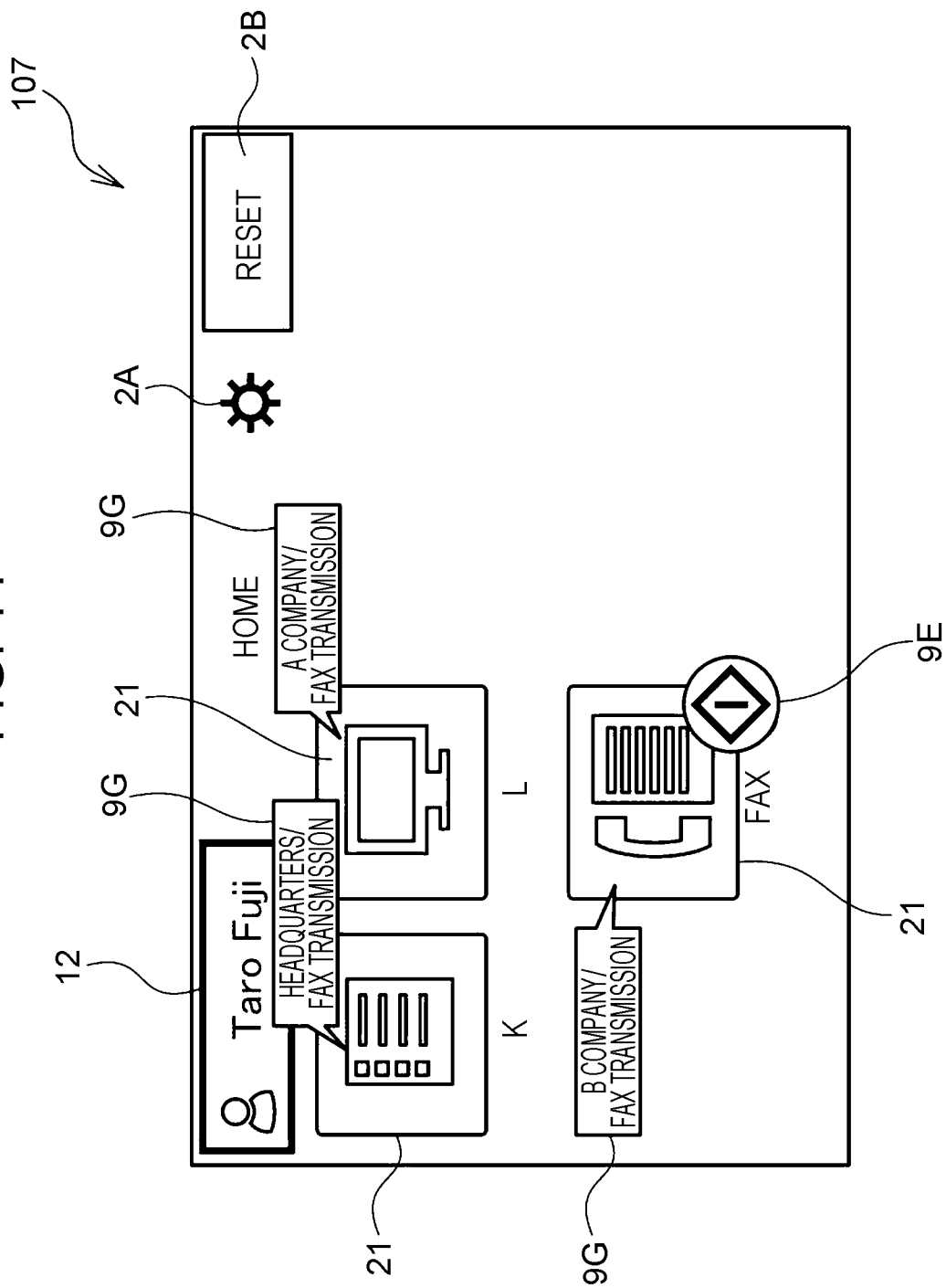
FIG. 14 is a schematic view illustrating an example of a changed home screen according to a second exemplary embodiment.

FIG. 14 is a schematic view illustrating an example of a changed home screen according to the second exemplary embodiment. In the example illustrated in FIG. 14, the service process for which an execution instruction has been cancelled is "fax", and selection buttons 21 for selection of service processes for executing a fax function are "fax", "K", and "L". Other selection buttons 21 are not displayed, and only the selection buttons 21 "fax", "K", and "L" are displayed on the home screen.

As described above, in the present exemplary embodiment, the selection button 21 (the selection button 21 for "fax" selected with a finger 14 in FIG. 8) for the service process for which an execution instruction has been cancelled is also displayed on the home screen.

Furthermore, to each of the selection buttons 21 displayed on the changed home screen, a setting contents display part 9G associated with the selection button 21 is added. In the example illustrated in FIG. 14, a fax destination and a text indicative of the type of service process are displayed as the setting contents display part 9G. The setting contents display part 9G "headquarters/FAX transmission" is added to the selection button 21 "K", and the setting contents display part 9G "A company/FAX transmission" is added to the selection button 21 "L". The setting contents display part 9G "B company/FAX transmission" is added to the selection button 21 for "fax" for which the execution instruction has been cancelled.

In the present exemplary embodiment, only selection buttons 21 for predicted service processes are displayed, and other selection buttons 21 are not displayed, and therefore the number of selection buttons 21 displayed on the changed home screen is smaller, as in the first exemplary embodiment. This makes it easier to select a target selection button 21 than on the original home screen.

Furthermore, a selection button 21 for a service process for which an execution instruction has been cancelled is displayed on the changed home screen. Therefore, even in a case where a user mistakenly cancels the instruction to execute the service process, the user can select the selection button 21 for the mistakenly cancelled service process again.

Furthermore, in the present exemplary embodiment, since the setting contents display part 9G is added to each of the selection buttons 21 displayed on the changed home screen, the user can select the target selection button 21 by using the added setting contents display part 9G as a clue.

Modification

FIG. 15 is a schematic view illustrating a modification of the home screen illustrated in FIG. 14. In the example illustrated in FIG. 15, a mark 9M is added to the selection button 21 for "fax" for which the execution instruction has been cancelled. An image having meaning such as "prohibition", "limitation", and "caution" may be used as the mark 9M. The mark 9M allows a user to know that a selection button 21 given the mark 9M is a selection button 21 for a service process for which an execution instruction has been cancelled.

Third Exemplary Embodiment

In the third exemplary embodiment, a selection button 21 for a predicted service process is displayed together with other selection buttons 21, and a setting contents display part 9G is displayed only on the selection button 21 for the predicted service process. The third exemplary embodiment is similar to the first exemplary embodiment except for this, and description of parts identical to those in the first exemplary embodiment is omitted.

In a "display changing process" according to the third exemplary embodiment, a service process of the same kind as a service process for which an execution instruction has been cancelled is searched for from home screen information. Then, information on images of selection buttons 21 is changed so that the setting contents display part 9G overlaps the selection button 21 for the service process of the same kind as the service process for which an execution instruction has been cancelled.

Figure 16:
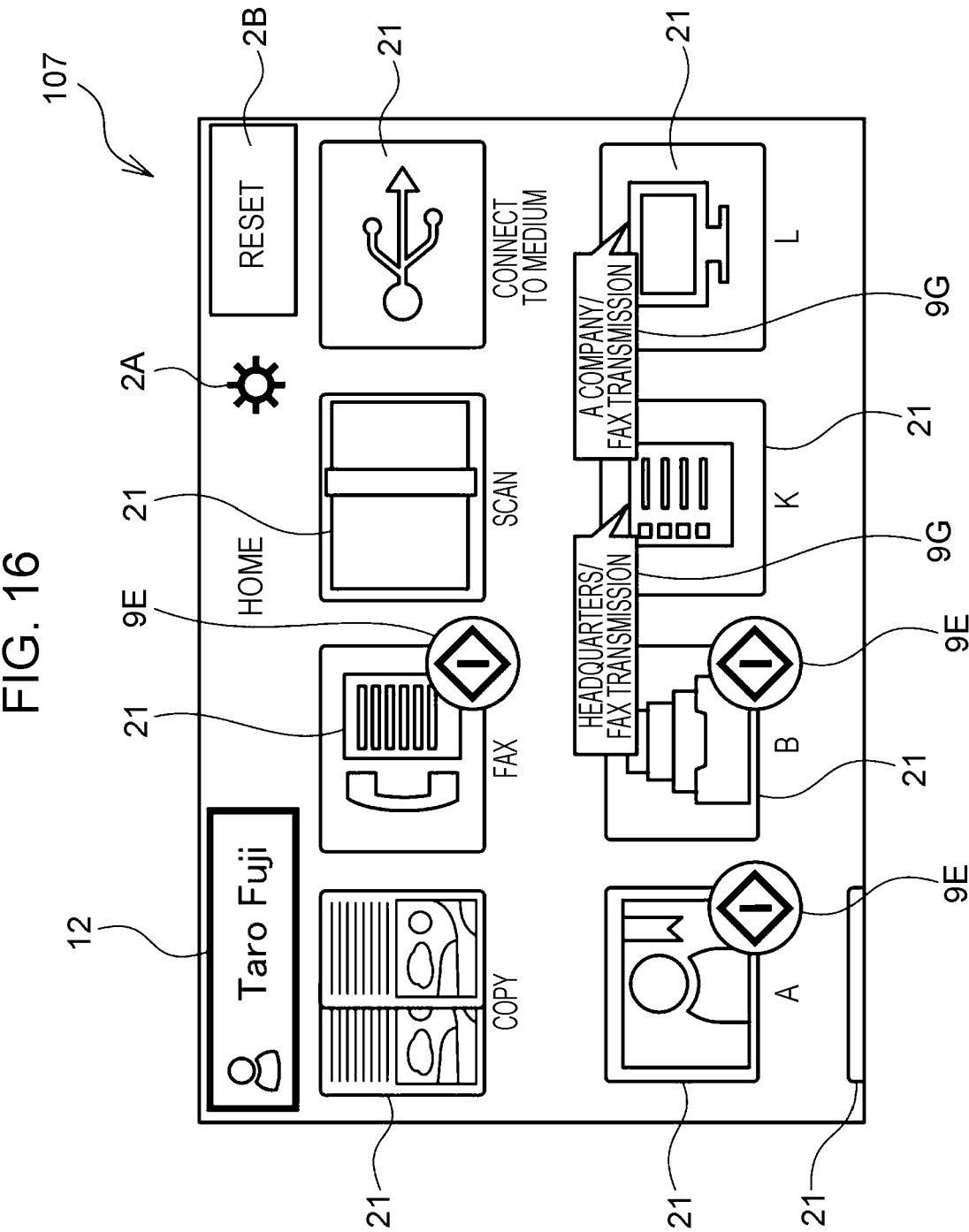
FIG. 16 is a schematic view illustrating an example of a changed home screen according to a third exemplary embodiment.

FIG. 16 is a schematic view illustrating an example of a changed home screen according to the third exemplary embodiment. When the "display changing process" is finished, a changed home screen is displayed. In the example illustrated in FIG. 16, the service process for which an execution instruction has been cancelled is "fax", and the setting contents display part 9G is added only to selection buttons 21 "K" and "L" for selection of service processes for executing a fax function.

The setting contents display part 9G "headquarters/FAX transmission" is added to the selection button 21 "K", and the setting contents display part 9G "A company/FAX transmission" is added to the selection button 21 "L". Meanwhile, no setting contents display part 9G is added to the selection button 21 for "fax" for which the execution instruction has been cancelled.

In the present exemplary embodiment, since the setting contents display part 9G is added only to a selection button 21 for a service process that is predicted as a service process to be selected by a user, the user selects a target selection button 21 while using the added setting contents display part 9G as a clue. Since the setting contents display part 9G varies from one selection button 21 to another, the setting contents display part 9G may be added to a selection button 21 for which an execution instruction has been cancelled.

Furthermore, the selection button 21 for a service process for which an execution instruction has been cancelled is displayed on the changed home screen. Therefore, even in a case where a user mistakenly cancels the instruction to execute the service process, the user can select the selection button 21 for the mistakenly cancelled service process again.

Other Modifications

Note that the configurations of the information processing apparatus and program described in the above exemplary embodiments are examples, and it is needless to say that the configurations can be changed without departing from the spirit of the present invention.

For example, although a display process in the image forming apparatus 10 has been described in the above exemplary embodiments, this display process can be performed in a similar manner in apparatuses other than the image forming apparatus 10. For example, the display process can be performed in an information processing apparatus having a display that receives a touch operation such as a tablet terminal.

In the case of a mobile terminal apparatus such as a tablet PC, which includes a motion sensor, a predetermined action such as an action of shaking the tablet PC in small motions may be detected as an action for a "cancelling" instruction by the motion sensor.

Reference Example/Prediction of Service Process

In the above exemplary embodiments, a selection button 21 for a predicted service process is a selection button 21 for a service process of the same kind as a service process for which an execution instruction has been cancelled. However, other than an operation state in which an execution instruction is cancelled, there are other operation states in which a service process to be selected next by a user can be predicted. This is described below as a reference example.

In the reference example, a predetermined user's operation state is detected from a result of detection of a document detection sensor of the image forming apparatus 10, an image of a user taken by the camera 113, presence or absence of document data accumulated in the memory 105, and contents of an image forming instruction. In the reference example, the predetermined operation state is a user's operation state in which the user is trying to select any of the selection buttons 21. The reference example is similar to the first exemplary embodiment other than the procedures of the "detection process" and the "display changing process", and therefore description of parts identical to those in the first exemplary embodiment is omitted.

Figure 17:
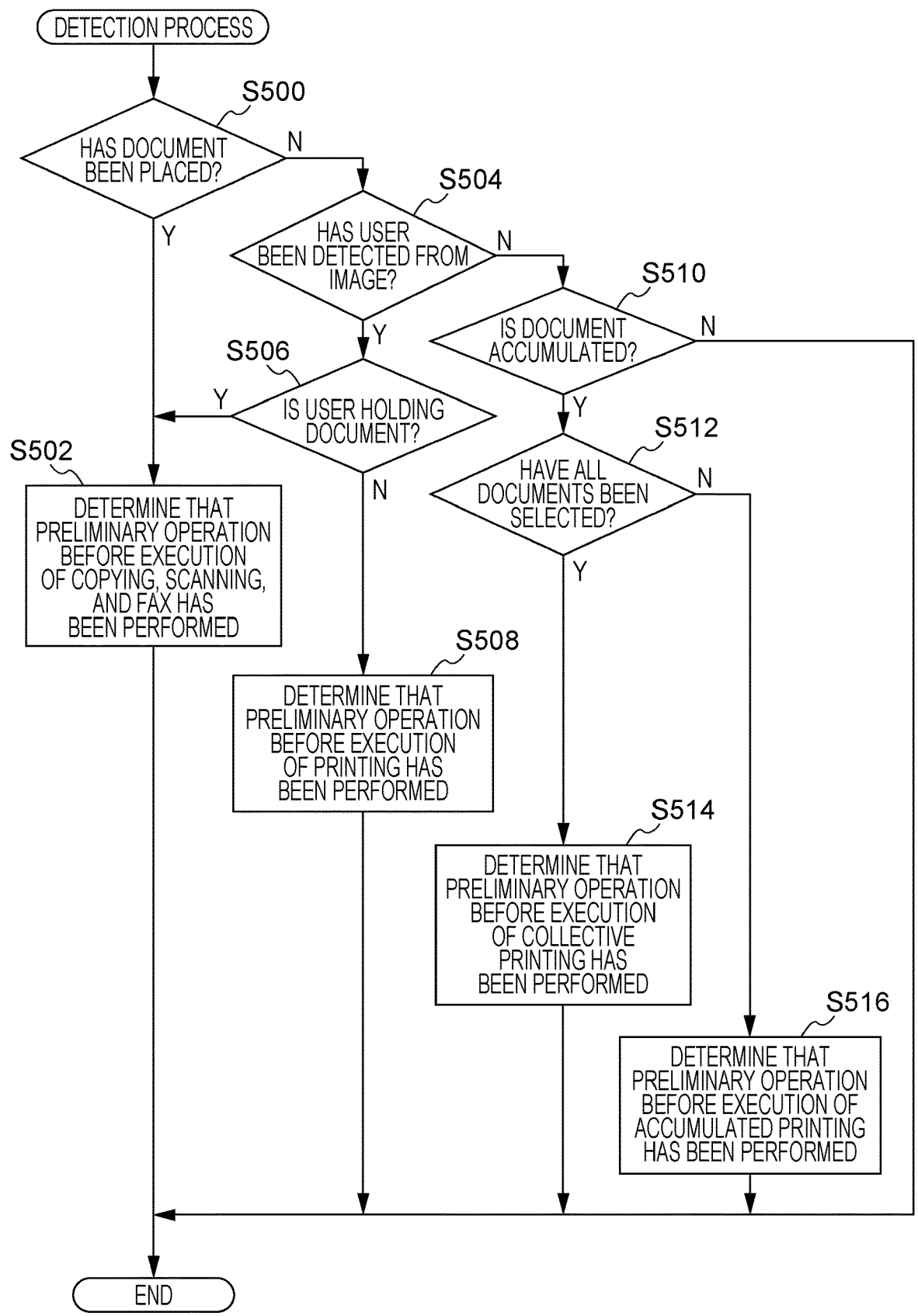
FIG. 17 is a flowchart illustrating an example of a flow of a "detection process" according to a reference example.

FIG. 17 is a flowchart illustrating a flow of a "detection process" according to the reference example. In the "detection process" according to the reference example, it is determined in Step 500 whether or not a document has been placed on a document feeder. A document detection sensor provided in the document feeder of the image reading unit 108 detects the placed document. Based on a result of this detection, it is determined whether or not a document has been placed on the document feeder. In a case where a document is placed, Step 502 is performed.

In Step 502, it is determined that a preliminary operation before execution of any of service processes of copying, scanning, and fax has been performed, and the routine is finished. That is, it is determined that a user is trying to select a selection button 21 for any of the service processes of copying, scanning, and fax.

In a case where no document is placed in Step 500, Step 504 is performed. In Step 504, it is determined whether or not a user has been detected on the basis of an image taken by the camera 113. When the user approaches the image forming apparatus 10 and enters a photographing range of the camera 113, the user is detected. In a case where the user is detected, Step 506 is performed.

In Step 506, it is determined whether or not the user is holding a document on the basis of the image of the user taken by the camera 113. In a case where an "action of approaching while holding a document" is detected from the image of the user by the action recognition unit 112, it is determined that the user is holding a document. Meanwhile, in a case where the "action of approaching while holding a document" is not detected from the image of the user by the action recognition unit 112, it is determined that the user is not holding a document.

In a case where the user is holding a document, Step 502 is performed. In Step 502, it is determined that a preliminary operation before execution of any of the service processes of copying, scanning, and fax has been performed.

In a case where the user is not holding a document, Step 508 is performed. In Step 508, it is determined that a preliminary operation before execution of a service process of printing has been performed, and the routine is finished. That is, it is determined that the user is trying to select a selection button 21 for the service process of printing.

In a case where no user is detected in Step 504, Step 510 is performed. In Step 510, it is determined whether or not document data is accumulated in the memory 105 by a user. In a case where document data is accumulated, Step 512 is performed. In a case where no document data is accumulated, the routine is finished. In a case where document data is accumulated, the service process of printing is performed on the basis of contents of an image forming instruction. In Step 512, it is determined whether or not all of the accumulated document data is selected on the basis of contents of the image forming instruction from the user.

In a case where all of the accumulated document data is selected, Step 514 is performed. In Step 514, it is determined that a preliminary operation before execution of a service process "collective printing" for collectively printing accumulated documents that have not been output yet has been performed, and the routine is finished. That is, it is determined that the user is trying to select a selection button 21 for the service process of collective printing.

In a case where not all of the accumulated document data is selected, i.e., in a case where part of the accumulated document data is selected, Step 516 is performed. In Step 516, it is determined that a preliminary operation before execution of a service process "accumulated printing" for printing the selected accumulated documents has been performed, and the routine is finished. That is, it is determined that the user is trying to select a selection button 21 for the service process of accumulated printing.

In a case of "accumulated printing", a data list of accumulated documents is displayed before execution of the service process. Meanwhile, in the case of "collective printing", the service process is executed without displaying a data list of accumulated documents.

In the reference example, the predetermined operation state is an operation state in which a document has been placed on the document feeder, an operation state in which a user has approached an image forming apparatus while holding a document, an operation state in which a user has approached an image forming apparatus without holding a document, an operation state in which a user has given an image forming instruction while selecting all of accumulated document data, or an operation state in which a user has given an image forming instruction while selecting part of accumulated document data. These operation states are operation states in which a user's next operation, i.e., which of the selection buttons 21 the user is trying to select can be predicted.

By displaying a selection button 21 for selection of a predicted service process in a more noticeable manner than the other selection buttons 21 upon detection of the predetermined operation state, it becomes easier to select a target selection button 21.

Figure 18:
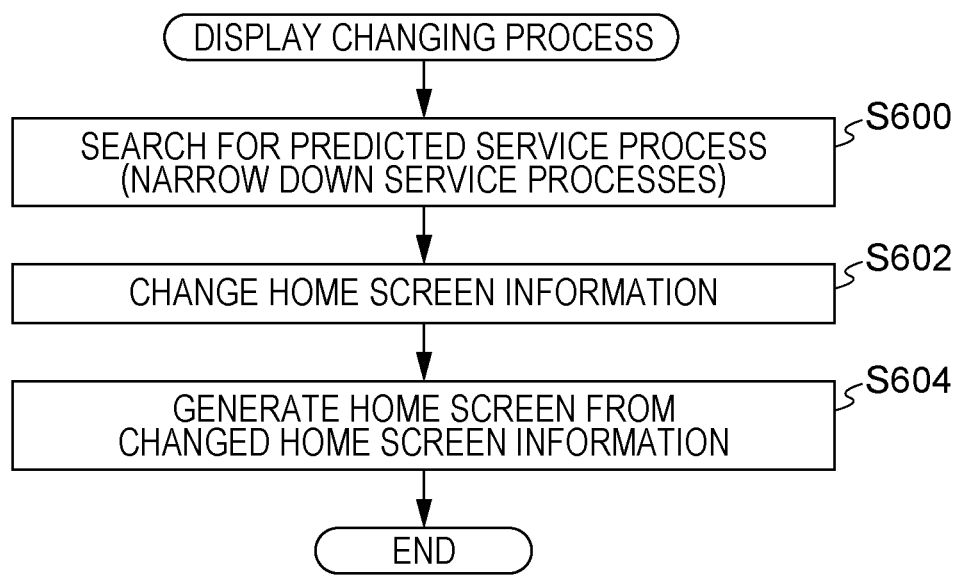
FIG. 18 is a flowchart illustrating an example of a flow of a "display changing process" according to the reference example.

FIG. 18 is a flowchart illustrating a flow of a "display changing process" according to the reference example. In the "display changing process" according to the third exemplary embodiment, a predicted service process is searched for from home screen information on the basis of a result of determination (a service process predicted from a preliminary operation) in Step 600. For example, in a case where the predicted service process is "printing", a service process registered as printing is searched for.

Next, in Step 602, home screen information is changed on the basis of a result of the search. Specifically, the home screen information is changed so that a selection button 21 for selection of the predicted service process is displayed and the other selection buttons 21 are deleted. That is, information on the other selection buttons 21 is deleted from information on plural selection buttons 21 displayed on a home screen for user. Next, in Step 604, a new home screen is generated on the basis of the changed home screen information, and then the routine is finished.

Figure 19:
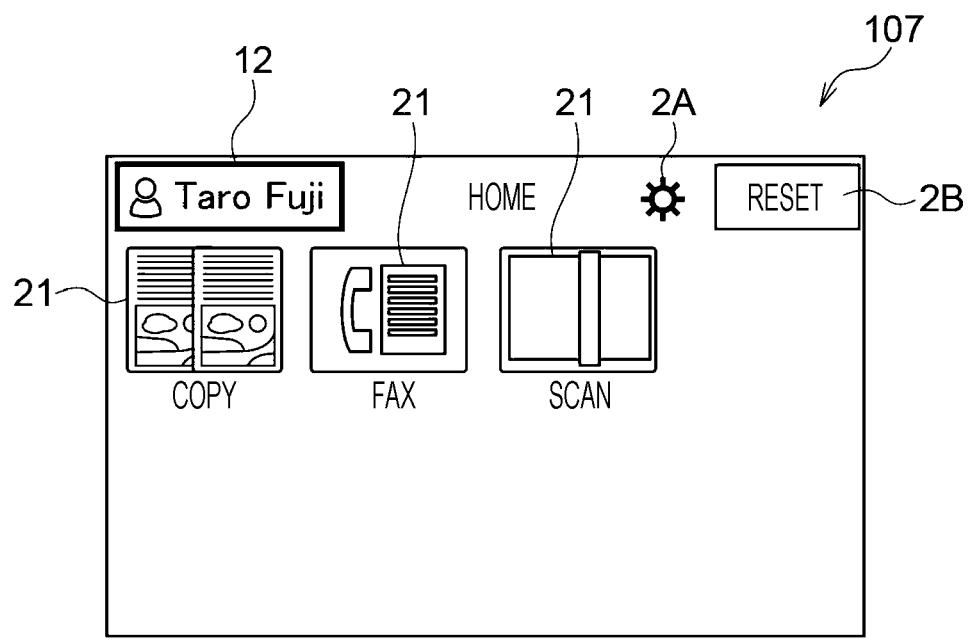
FIG. 19 is a schematic view illustrating an example of a changed home screen.

FIG. 19 is a schematic view illustrating an example of a changed home screen. When the "display changing process" is finished, a changed home screen is displayed (Step 112 of FIG. 7). The example illustrated in FIG. 19 is a home screen displayed in a case where it is determined that a preliminary operation before execution of any of the service processes of copying, scanning, and fax has been performed. Only selection buttons 21 for copying, scanning, and fax that are predicted service processes are displayed on the home screen.

In the reference example, a service process to be selected by a user is predicted, and only a selection button 21 for the predicted service process is displayed on a home screen. This reduces the number of selection buttons 21 displayed on the home screen, thereby allowing the user to select a target selection button 21 without trouble.

Although an example in which selection buttons 21 other than a selection button 21 for a predicted service process are not displayed has been described in the reference example, it is only necessary that the selection button 21 for the predicted service process be selectively displayed. For example, one or more selection buttons 21 may be displayed in a more noticeable manner than the other selection buttons 21 or the other selection buttons 21 may be displayed in a less noticeable manner than the one or more selection buttons 21, as in the above exemplary embodiments.

An information processing apparatus according to the reference example includes a display on which plural operators for selection of service processes are displayed and a detection unit that detects a user's operation state before selection of any of the operators, in which in a case where a predetermined operation state is detected as a preliminary operation for execution of a service process, the display selectively displays one or more operators for selection of a service process predicted from the preliminary operation among the plural operators.

The display may display the one or more operators in a more noticeable manner than the other operators or may display the other operators in a less noticeable manner than the one or more operators.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display that displays, on a display screen, a plurality of operators for selection of service processes; and
   a processor configured to function as a detection unit that detects an operation state of a user who selects any of the service processes,
   wherein upon detection of an operation state in which an instruction to execute a service process has been cancelled after issuance of the instruction, the processor is further configured to (a) acquire, from a memory, one or more operators for selection of a service process of a same kind as the service process for which the instruction has been cancelled among the plurality of operations, and (b) change the display to selectively display the one or more operators on a changed display screen, wherein a settings content display part is added to one of the one or more operators on the changed display screen.

2. The information processing apparatus according to claim 1, wherein
   the one or more operators are displayed in a relatively emphasized manner.

3. The information processing apparatus according to claim 2, wherein
   the display selectively displays the one or more operators in a more noticeable manner than other operators.

4. The information processing apparatus according to claim 3, wherein
   the display displays the one or more operators in a size larger than an original size, displays the one or more operators at a density higher than an original density, or displays the one or more operators at brightness higher than original brightness.

5. The information processing apparatus according to claim 3, wherein
   the display displays, on each of the one or more operators, information indicative of contents of setting of a service process set for each of the one or more operators.

6. The information processing apparatus according to claim 2, wherein
   the display selectively displays other operators in a less noticeable manner than the one or more operators.

7. The information processing apparatus according to claim 6, wherein
   the display displays the other operators in a size smaller than an original size, displays the other operators at a density lower than an original density, displays the other operators at brightness lower than original brightness, or does not displays the other operators.

8. The information processing apparatus according to claim 1, wherein
   the display also displays an operator for selection of the service process for which the instruction has been cancelled.

9. The information processing apparatus according to claim 8, wherein
   the operator for selection of the service process for which the instruction has been cancelled is displayed in a manner distinguishable from the one or more operators.

10. The information processing apparatus according to claim 1, wherein
    the display does not display an operator for selection of the service process for which the instruction has been cancelled.

11. The information processing apparatus according to claim 1, wherein
    the plurality of operators include an operator other than an operator prepared in advance.

12. The information processing apparatus according to claim 11, wherein
    the plurality of operators include an operator that is set so that execution of a service process is started by selection of the operator.

13. The information processing apparatus according to claim 1, wherein
    the operation state of the user includes an operation state produced by voice or an action; and
    the operation state in which the instruction to execute the service process has been cancelled after issuance of the instruction is detected by voice recognition or action recognition.

14. A non-transitory computer readable medium storing a program causing a computer to function as the units of the information processing apparatus according to claim 1.

15. The information processing apparatus according to claim 1, wherein the processor is configured to change the display to selectively display only the one or more operators on the changed display screen.

16. The information processing apparatus according to claim 1, wherein upon detection of an operation state in which an instruction to execute a service process has been cancelled after issuance of the instruction within a time required for execution of the service process after issuance of the instruction, the processor is configured to (a) acquire, from the memory, the one or more operators for selection of the service process of the same kind as the service process for which the instruction has been cancelled among the plurality of operations, and (b) change the display to selectively display the one or more operators on the changed display screen, wherein the time required for execution of the service process is shown as a progress icon on the display.

17. An information processing apparatus comprising:
    display means for displaying, on a display screen, a plurality of operators for selection of service processes; and
    detection means for detecting an operation state of a user who selects any of the service processes, wherein upon detection of an operation state in which an instruction to execute a service process has been cancelled after issuance of the instruction, the detection means is further configured to (a) acquire, from a storage means, one or more operators for selection of a service process of a same kind as the service process for which the instruction has been cancelled among the plurality of operations, and (b) change the display means to selectively display one or more operators on a changed display screen, wherein a settings content display part is added to one of the one or more operators on the changed display screen.

* * * * *